(12) United States Patent
Mori

(10) Patent No.: US 11,632,479 B2
(45) Date of Patent: Apr. 18, 2023

(54) DISPLAY APPARATUS, IMAGE PROCESSING APPARATUS, AND NON-TRANSITORY COMPUTER READABLE MEDIUM FOR DISPLAYING IMAGES TO ACCEPT AND CONFIRM SETTINGS

(71) Applicant: FUJIFILM BUSINESS INNOVATION CORP., Tokyo (JP)

(72) Inventor: Yasuhiro Mori, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 262 days.

(21) Appl. No.: 16/828,431

(22) Filed: Mar. 24, 2020

(65) Prior Publication Data

US 2020/0412889 A1  Dec. 31, 2020

(30) Foreign Application Priority Data

Jun. 27, 2019  (JP) .............................. JP2019-120134

(51) Int. Cl.
*H04N 1/00* (2006.01)
(52) U.S. Cl.
CPC ....... *H04N 1/00482* (2013.01); *H04N 1/0097* (2013.01); *H04N 1/00416* (2013.01)
(58) Field of Classification Search
None
See application file for complete search history.

(56) References Cited

U.S. PATENT DOCUMENTS

2008/0126959 A1* 5/2008 Naick ................ G06F 9/44505
715/764
2017/0329563 A1* 11/2017 Otsuka ................ G06F 3/1225

FOREIGN PATENT DOCUMENTS

| JP | 2000-56887 A | 2/2000 |
| JP | 2002-108531 A | 4/2002 |
| JP | 2003-323244 A | 11/2003 |
| JP | 2009-205194 A | 9/2009 |
| JP | 2009-259230 A | 11/2009 |
| WO | 2014/188497 A1 | 11/2014 |

OTHER PUBLICATIONS

Jan. 10, 2023 Office Action issued in Japanese Patent Application No. 2019-120134.

* cited by examiner

*Primary Examiner* — Lennin R Rodriguezgonzalez
(74) *Attorney, Agent, or Firm* — Oliff PLC

(57) ABSTRACT

A display apparatus includes a processor. The processor is configured to: generate a first image including (i) a setting area for receiving a setting of a setting item and (ii) a command area for receiving a command regarding the setting; generate a second image representing the command area; receive an operation on the setting item performed by a user; and display the second image over the first image in a case where the command area is not displayed when the processor receives the operation.

17 Claims, 14 Drawing Sheets

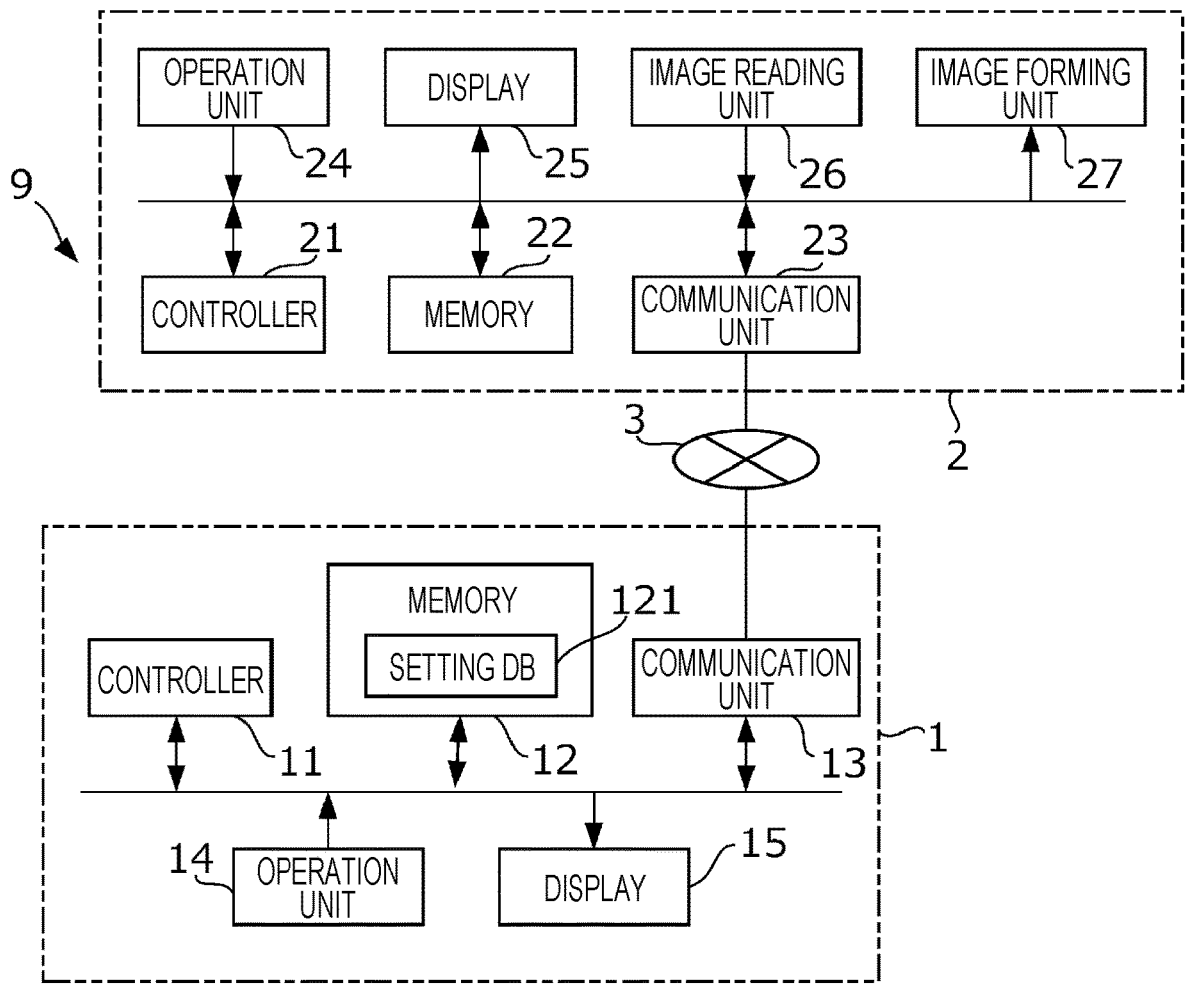

FIG. 4

| ID | ITEM NAME | VALUE | TO-BE-SET | TYPE | CHILD |
|---|---|---|---|---|---|
| | N1 | | | | |
| M1 | NOTIFICATION BY EMAIL | … | … | … | N2 |
| M2 | DESTINATION HOST NAME … | … | … | … | … |
| M3 | DESTINATION DIRECTORY … | … | ✓ | … | … |
| M4 | FILE FORMAT | … | … | … | … |
| M5 | COMMENT | … | ✓ | … | … |
| M6 | AUTO UPRIGHT | … | … | … | … |
| M7 | DOCUMENT SIZE | … | … | … | … |
| M8 | SCREEN SCAN | … | … | … | … |
| M9 | RESOLUTION | … | … | … | … |
| M10 | COLOR MODE | … | … | … | … |
| M11 | TITLE | … | ✓ | … | … |
| M12 | SERVER PASSWORD | … | ✓ | … | … |
| M13 | SERVER PASSWORD RE-ENTRY … | … | ✓ | … | … |
| M14 | CONTRAST | … | … | … | … |
| M15 | DOCUMENT TYPE | … | … | … | … |
| M16 | SERVER USER NAME | … | ✓ | … | … |

FIG. 7

| | | |
|---|---|---|
| NOTIFICATION BY EMAIL | | SETTING |
| DESTINATION HOST NAME/ADDRESS | | |
| DESTINATION DIRECTORY/FILE NAME | * | |
| FILE FORMAT | | PDF |
| COMMENT | * | |
| AUTO UPRIGHT | | OFF |
| DOCUMENT SIZE | | AUTO |
| SCREEN SCAN | | OFF |
| RESOLUTION | | 400 dpi |
| COLOR MODE | | Full Color |
| TITLE | * | |
| SERVER PASSWORD | * | |
| SERVER PASSWORD RE-ENTRY | * | |
| CONTRAST | | Normal |
| DOCUMENT TYPE | | Text&Photo |
| SERVER USER NAME | * | |

Cancel    OK

FIG. 11

| NOTIFICATION BY EMAIL | SETTING |
| --- | --- |
| DESTINATION HOST NAME/ADDRESS | |
| DESTINATION DIRECTORY/FILE NAME * | |
| FILE FORMAT | PDF |
| COMMENT * | |
| AUTO UPRIGHT | OFF |
| DOCUMENT SIZE | AUTO |
| SCREEN SCAN | OFF |
| RESOLUTION | 400dpi |
| COLOR MODE | Full Color |
| TITLE * | |
| SERVER PASSWORD * | |
| SERVER PASSWORD RE-ENTRY * | |
| CONTRAST | Normal |
| DOCUMENT TYPE | Text&Photo |
| SERVER USER NAME * | |

Message M1: "There exist the following to-be-set items: 2 in the upper portion (1 within the screen) 4 in the lower portion (2 within the screen)."

Labels: G1, V, M1, L1

Cancel   OK

FIG. 12A

| COMMENT | * | TEST |
|---|---|---|
| AUTO UPRIGHT | | OFF |
| DOCUMENT SIZE | | AUTO |
| SCREEN SCAN | | OFF |
| RESOLUTION | | 400 dpi |
| COLOR MODE | | Full Color |
| TITLE | * | DRAFT TITLE |
| SERVER PASSWORD | * | passwd |

FIG. 12B

| COMMENT | * | TEST |
|---|---|---|
| AUTO UPRIGHT | | OFF |
| DOCUMENT SIZE | | AUTO |
| SCREEN SCAN | | OFF |
| RESOLUTION | | 400 dpi |
| COLOR MODE | | Full Color |
| OK Cancel | * | DRAFT TITLE |
| | * | passwd |

FIG. 13A

| NOTIFICATION BY EMAIL | SETTING |
| --- | --- |
| DESTINATION HOST NAME/ADDRESS | |
| DESTINATION DIRECTORY/FILE NAME * | D X |
| FILE FORMAT | PDF |
| COMMENT * | TEST |
| AUTO UPRIGHT | OFF |
| DOCUMENT SIZE | AUTO |
| SCREEN SCAN | OFF |

FIG. 13B

| NOTIFICATION BY EMAIL | |
| --- | --- |
| NOTIFY BY EMAIL | ✓ |
| EMAIL ADDRESS 1 | aaa@bbb.ccc |
| EMAIL ADDRESS 2 | ddd@eee.fff |
| Cancel | OK |

FIG. 14

| ID |
|---|
| N1 |
| N2 |
| ... |

| N1 | U1 | | U2 | |
|---|---|---|---|---|
| ID | START | PERIOD | START | PERIOD |
| M1 | 1 | 4 | 0 | 5 |
| M2 | 1 | 1 | 0 | 1 |
| M3 | 1.5 | 3 | 2 | 4 |
| M4 | 1 | 1 | 1 | 1.5 |
| : | : | : | : | : |

FIG. 16

| IPv4 | | | | | MANUAL | — A11 |
|---|---|---|---|---|---|---|
| > IP ADDRESS | 255 | . 255 | . 255 | . 255 | | |
| > SUBNET MASK | 255 | . 255 | . 0 | . 0 | | } A12 |
| > DEFAULT GATEWAY | 255 | . 255 | . 255 | . 255 | | |
| IPv6 | | OK | Cancel | | ← G1 | |
| : | | | | | G2 | |

FIG. 17

| DESTINATION DIRECTORY/FILE NAME | * | | A11 |
|---|---|---|---|
| FILE FORMAT | | PDF | A11 |
| COMMENT | * | | A11 |
| AUTO UPRIGHT | | OFF | : |
| DOCUMENT SIZE | | AUTO | |
| SCREEN SCAN | | OFF | |
| RESOLUTION | | 400 dpi | |
| COLOR MODE | | Auto Detect | ← G1 |

FIG. 18

| DESTINATION DIRECTORY/FILE NAME | * | |
|---|---|---|
| FILE FORMAT | | PDF — A11 |
| > ● PDF | | |
| > ○ XPS | | |
| > ○ TIFF | | A13 |
| > ○ JPEG | | |
| COMMENT | * | — A11 |
| AUTO UPRIGHT | | OFF |

FIG. 19

| DESTINATION DIRECTORY/FILE NAME | * | |
|---|---|---|
| FILE FORMAT | | PDF |
| > ○ PDF | | |
| > ○ XPS | | |
| > ○ TIFF | | |
| > ● JPEG | | |
| COMMENT | | |
| AUTO UPRIGHT | | OFF |
| DOCUMENT SIZE | | AUTO |
| SCREEN SCAN | | OFF |
| RESOLUTION | | 400 dpi |
| COLOR MODE | | Auto Detect |

M2: JPEG is unspecifiable as the file format when the color mode is Auto Detect.

G2: OK / Cancel

DISPLAY APPARATUS, IMAGE PROCESSING APPARATUS, AND NON-TRANSITORY COMPUTER READABLE MEDIUM FOR DISPLAYING IMAGES TO ACCEPT AND CONFIRM SETTINGS

CROSS-REFERENCE TO RELATED APPLICATIONS

This application is based on and claims priority under 35 USC 119 from Japanese Patent Application No. 2019-120134 filed Jun. 27, 2019.

BACKGROUND

(i) Technical Field

The present disclosure relates to a display apparatus, an image processing apparatus, and a non-transitory computer readable medium.

(ii) Related Art

Various techniques have been examined for displaying settings for the user to check. For example, Japanese Unexamined Patent Application Publication No. 2000-56887 describes a wrong operation suppressing method of displaying a checking window including message text for checking whether fetching is allowed in the case of fetching an operation input; and not accepting a response operation input that allows the real fetching of an operation input until a predetermined time has elapsed after the start of the display, thereby reliably causing a person who operates a screen to read the message text.

Japanese Unexamined Patent Application Publication No. 2002-108531 describes a communication terminal apparatus that, in response to selection of only one of major items with a selection key, displays, for the selected major item, setting items of a plurality of related internal functions included in the major item and a lower layer below the major item; and, for an unselected major item(s), displays only the major item(s).

Japanese Unexamined Patent Application Publication No. 2003-323244 describes an information processing apparatus that, in response to an input in a moving direction, moves a display area to allow an end portion of the display area closest to an end portion of a display screen in the input moving direction to match the end portion of the display screen.

By the way, a setting image displayed by a display apparatus for allowing the user to check various settings includes, for example, a setting area representing one or more setting items and a command area for making a command to confirm or cancel the settings of these settings items. When there are many setting items compared with the size of an area (referred to as a display area) of the display apparatus where the setting items are displayed, the command area may not fit in the display area. In this case, the display apparatus may need to receive an operation from the user, for example, for scrolling the display area in order to display the command area, and move the setting image relative to the display area. In particular, a display apparatus such as a smart phone, a tablet personal computer (PC), or the like has a display area with a limited size. Thus, it requires frequent scrolling in order to display the command area, which reduces the use's ease of operation.

SUMMARY

Aspects of non-limiting embodiments of the present disclosure relate to a display apparatus that receives a command regarding a setting of a setting item received in a setting area of a first image even in the case where a command area of the first image is not displayed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a display apparatus including a processor. The processor is configured to: generate a first image including (i) a setting area for receiving a setting of a setting item and (ii) a command area for receiving a command regarding the setting; generate a second image representing the command area; receive an operation on the setting item performed by a user; and display the second image over the first image in a case where the command area is not displayed when the processor receives the operation.

BRIEF DESCRIPTION OF THE DRAWINGS

An exemplary embodiment of the present disclosure will be described in detail based on the following figures, wherein:

FIG. 2 is a diagram illustrating an example of the configuration of a display apparatus and an image processing apparatus;

FIG. 3 is a diagram illustrating an example of a setting database (DB);

FIG. 4 is a diagram illustrating an example of data of one or more setting items included in a setting;

FIG. 7 is a diagram illustrating an example of a first image;

FIG. 11 is a diagram illustrating an example of guidance on to-be-set items;

FIGS. 12A and 12B are diagrams illustrating an example of the second image displayed over the first image;

FIGS. 13A and 13B are diagrams for describing a setting item that belongs to a lower layer;

FIG. 14 is a diagram illustrating the time point at which the second image is displayed, which is defined for every combination of a user and a setting item;

FIG. 16 is a diagram for describing the second image displayed in the case where the setting items in the lower layer are expanded;

FIG. 17 is a diagram illustrating an example of a setting item set with a radio button;

FIG. 18 is a diagram illustrating an example in which a radio button is expanded for setting; and FIG. 19 is a diagram illustrating the displayed details when a setting based on a received operation contradicts the setting of another setting item.

DETAILED DESCRIPTION

Exemplary Embodiment

Configuration of Image Processing System

Figure 1:
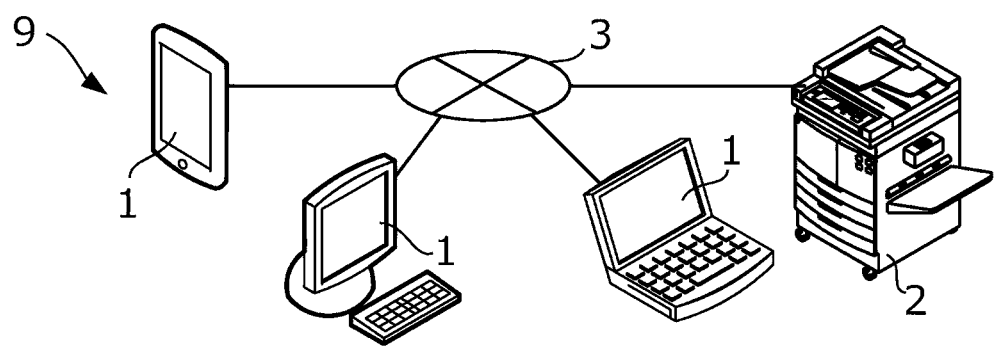
FIG. 1 is a diagram illustrating an example of the overall configuration of an image processing system.

FIG. 1 is a diagram illustrating an example of the overall configuration of an image processing system 9. The image processing system 9 includes one or more display apparatuses 1, an image processing apparatus 2, and a communication line 3 that enables these apparatuses to communicate with each other. The communication line 3 may be, for example, a local area network (LAN), a wide area network (WAN), the Internet, or a combination thereof.

Configuration of Display Apparatus

FIG. 2 is a diagram illustrating an example of the configuration of the display apparatus 1 and the image processing apparatus 2.

The display apparatus 1 illustrated in FIG. 2 includes a controller 11, memory 12, a communication unit 13, an operation unit 14, and a display 15.

The controller 11 includes a central processing unit (CPU), read-only memory (ROM), and random-access memory (RAM), and controls each unit of the display apparatus 1 by reading and executing, by the CPU, a computer program (hereinafter simply referred to as a "program") stored in the ROM or the memory 12.

The communication unit 13 is a communication circuit that establishes connection with the communication line 3 by wire or wirelessly. Using the communication unit 13, the display apparatus 1 exchanges information with the image processing apparatus 2 and another external apparatus connected to the communication line 3. Note that the display apparatus 1 need not include the communication unit 13 when the display apparatus 1 need not exchange information with the image processing apparatus 2 or an external apparatus.

The operation unit 14 includes operators such as operation buttons, a keyboard, and/or a touchscreen for making various commands. The operation unit 14 receives an operation performed by the user, and sends a signal in accordance with the details of the operation to the controller 11. An operation performed by the user includes, for example, keystrokes on the keyboard and/or gestures on the touchscreen.

The display 15 includes a display screen such as a liquid crystal display, and displays an image under control of the controller 11. A transparent touchscreen of the operation unit 14 may be arranged on the display screen.

The memory 12 is a storage unit such as a solid state drive or a hard disk drive, and stores an operating system, various programs, data, and the like, which are read by the CPU of the controller 11.

In addition, the memory 12 includes a setting database (DB) 121. FIG. 3 is a diagram illustrating an example of the setting DB 121. The setting DB 121 illustrated in FIG. 3 is a database that stores each "setting" including one or more setting items, along with the setting's "identification (ID)" and "setting name". The "ID" illustrated in FIG. 3 is identification information of a corresponding setting, and the "setting name" indicates the name of a corresponding setting.

In addition, "data" illustrated in FIG. 3 is specific data representing the details of a corresponding setting. FIG. 4 is a diagram illustrating an example of data of one or more setting items included in a setting. The data illustrated in FIG. 4 represents, for example, the details of data indicated by a bold frame in FIG. 3.

The "ID" illustrated in FIG. 4 is identification information of each of setting items included in a setting whose setting name is "scan and save". Therefore, this setting includes sixteen setting items M1 to M16. The "setting name" illustrated in FIG. 4 is a field representing the name of each setting item. The "value" illustrated in FIG. 4 is a field representing a value set to each setting item.

In addition, "to-be-set" illustrated in FIG. 4 is a field for storing binary information representing whether a corresponding setting item requires the user to perform an operation. A setting item whose "to-be-set" is "✓" is referred to as a "to-be-set item". In the case where an initial value is defined, the initial value is set to each setting item unless the user performs an operation. In contrast, there are setting items that require checking of the user's explicit intention. No initial value is defined for a to-be-set item because it involves checking of the user's intention, and nothing is set unless the user performs an operation. For example, the setting item whose setting name is "title" illustrated in FIG. 4 is a to-be-set item.

The "type" illustrated in FIG. 4 is a field for storing information representing the type of setting item. Types of setting items include, for example, text, choice, numeral, and so forth.

The "child" illustrated in FIG. 4 is a field for storing the ID of a setting in a lower layer that is directly associated with a setting item. The setting items illustrated in FIG. 4 have a hierarchical structure. For example, "N2" is associated with the setting item whose setting name is "notification by email", as the ID of the setting of "child" serving as a lower layer. This indicates that, in response to an operation on the setting item "notification by email", among setting items included in the setting whose setting name is "scan and save", the setting whose ID is "N2" in FIG. 3, that is, whose setting name is "notification by email", is displayed as a lower layer setting, indicating that this setting serves as a target of operation.

Configuration of Image Processing Apparatus

The image processing apparatus 2 illustrated in FIG. 2 includes a controller 21, memory 22, a communication unit 23, an operation unit 24, a display 25, an image reading unit 26, and an image forming unit 27.

The controller 21 has, for example, a configuration common to the controller 11, and controls each unit of the image processing apparatus 2. The memory 22, the communication unit 23, the operation unit 24, and the display 25 also have configurations respectively common to the memory 12, the communication unit 13, the operation unit 14, and the display 15 of the display apparatus 1. Note that the image processing apparatus 2 need not include the operation unit 24 or the display 25. In addition, the image processing apparatus 2 need not include the communication unit 23 when the image processing apparatus 2 need not exchange information with the display apparatus 1 or an external apparatus.

The image reading unit 26 includes, for example, an imaging sensor such as a complementary metal oxide semiconductor (CMOS) or a charge coupled device (CCD). The image reading unit 26 optically reads an image formed on a medium such as a paper sheet and generates image data representing the image.

The image forming unit 27 forms an image on a medium such as a paper sheet by using, for example, an electrophotographic method.

Note that the reading function of the image reading unit 26 and the image forming function of the image forming unit 27 are examples of a configuration for implementing "an image processing function" of the image processing apparatus 2. The image processing apparatus 2 need not include the image reading unit 26 or the image forming unit 27 when the image processing apparatus 2 has a function of processing an image using setting items set by the display apparatus 1.

Functional Configuration of Image Processing Apparatus

Figure 5:
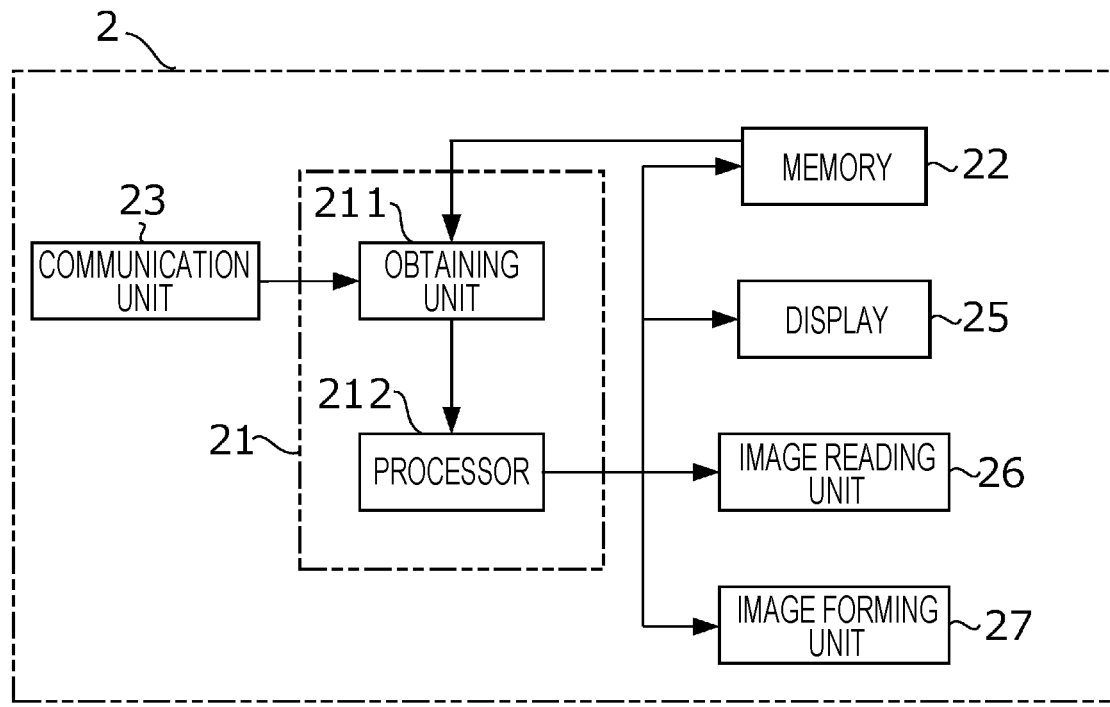
FIG. 5 is a diagram illustrating an example of the functional configuration of the image processing apparatus.

FIG. 5 is a diagram illustrating an example of the functional configuration of the image processing apparatus 2. By reading and executing a program stored in the memory 22, the controller 21 of the image processing apparatus 2 functions as an obtaining unit 211 and a processor 212.

The obtaining unit 211 obtains a setting item set by the display apparatus 1 via the communication unit 23.

The processor 212 processes an image using a setting item obtained by the obtaining unit 211. That is, the processor 212 is an example of a processor that processes an image using a setting item set by a display apparatus. The processor 212 processes an image by controlling, for example, at least one of the memory 22, the display 25, the image reading unit 26, and the image forming unit 27 using the above-mentioned setting item.

Functional Configuration of Display Apparatus

Figure 6:
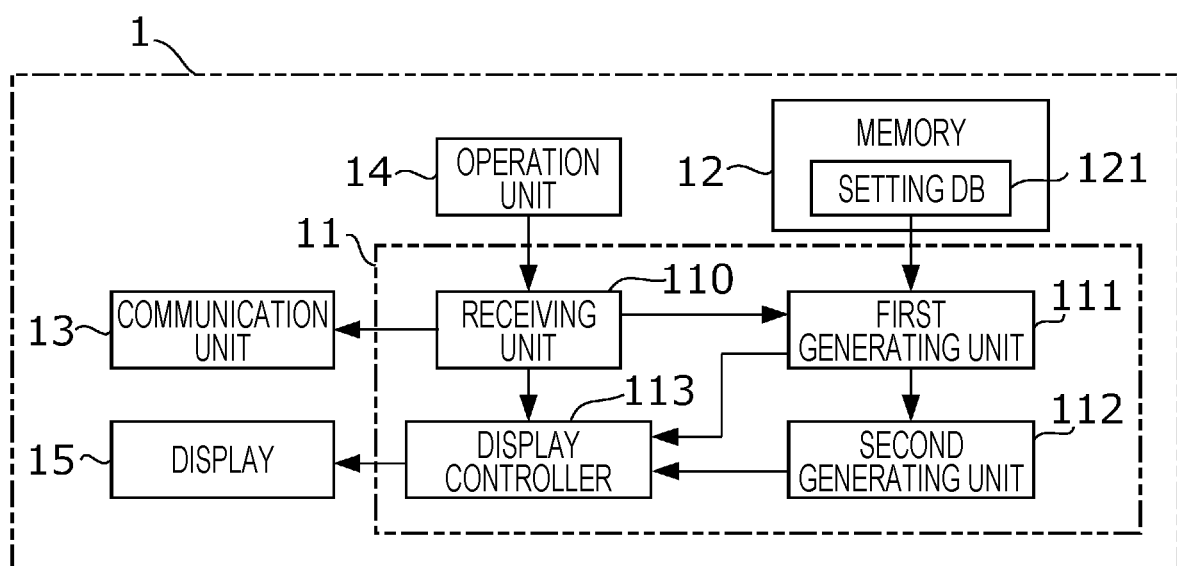
FIG. 6 is a diagram illustrating an example of the functional configuration of the display apparatus.

FIG. 6 is a diagram illustrating an example of the functional configuration of the display apparatus 1. By reading and executing a program stored in the memory 12, the controller 11 of the display apparatus 1 functions as a receiving unit 110, a first generating unit 111, a second generating unit 112, and a display controller 113.

The receiving unit 110 receives an operation performed by the user from the operation unit 14. When the user performs an operation to select any of the settings illustrated in FIG. 3, for example, the receiving unit 110 obtains information representing the operation from the operation unit 14 and reports the information to the first generating unit 111.

On the basis of the information reported from the receiving unit 110, the first generating unit 111 generates a first image for allowing the user to perform the selected setting.

FIG. 7 is a diagram illustrating an example of the first image. In the case where the user selects, for example, the setting whose setting name is "scan and save", the first generating unit 111 reads the data illustrated in FIG. 4 from the setting DB 121 in the memory 12, and generates the first image illustrated in FIG. 7. The first image illustrated in FIG. 7 includes a setting area A1 for receiving settings of sixteen setting items illustrated in FIG. 4, and a command area A2 for receiving a command for confirming a setting or a command for canceling a setting received in the setting area A1. A command for confirming a received setting and a command for canceling the setting are both included in commands regarding the setting. In short, the command area A2 is an area for receiving a command regarding a setting received in the setting area A1. Note that "a command regarding a setting" is not restricted to a command for confirming the setting and a command for canceling the setting, and may be, for example, a command for initializing the setting or a command for checking contradictions of the setting.

In the setting area A1 illustrated in FIG. 7, setting item areas A11 respectively representing sixteen setting items are arranged in a vertical direction. A confirm button A21 and a cancel button A22 are arranged in the command area A2 illustrated in FIG. 7. The confirm button A21 is a button for receiving a command for confirming a setting from the user. The cancel button A22 is a button for receiving a command for canceling a setting from the user. The character string "OK" is displayed on the confirm button A21 illustrated in FIG. 7, and the character string "Cancel" is displayed on the cancel button A22. The confirm button A21 and the cancel button A22 are arranged in a horizontal direction in the command area A2 illustrated in FIG. 7; the confirm button A21 is arranged on the right side, and the cancel button A22 is arranged on the left side.

That is, the first generating unit 111 illustrated in FIG. 6 is an example of a first generating unit that generates a first image including a setting area for receiving a setting of a setting item, and a command area for receiving a command regarding the setting.

The second generating unit 112 generates an image corresponding to the command area (referred to as a second image) out of the first image generated by the first generating unit 111.

Figure 8:
FIG. 8 is a diagram illustrating an example of a second image.

FIG. 8 is a diagram illustrating an example of the second image. The second image illustrated in FIG. 8 includes a command area A3 corresponding to the command area A2 of the first image illustrated in FIG. 7. A confirm button A31 and a cancel button A32 are arranged in the command area A3. The confirm button A31 is a button for receiving a command for confirming a setting from the user. The cancel button A32 is a button for receiving a command for canceling a setting from the user. The character string "OK" is displayed on the confirm button A31 illustrated in FIG. 8, and the character string "Cancel" is displayed on the cancel button A32. That is, the second generating unit 112 illustrated in FIG. 6 is an example of a second generating unit that generates a second image representing a command area.

Note that the command area A2 of the first image and the command area A3 of the second image may have different button arrangements as long as they are areas including a common set of buttons for receiving commands for a setting. For example, the confirm button A31 is arranged on the left side, and the cancel button A32 is arranged on the right side in the command area A3 illustrated in FIG. 8. This arrangement is opposite to that of the command area A2 of the first image.

The display controller 113 causes the display 15 to display the first image generated by the first generating unit 111. The user looks at the first image displayed by the display controller 113 on the display 15. The user touches an area corresponding to any of the setting items included in the first image on a touchscreen or the like of the operation unit 14, and performs an operation on the setting item. The receiving unit 110 receives the operation performed by the user from the operation unit 14. That is, the receiving unit 110 is an example of a receiving unit that receives an operation performed by a user on a setting item.

When the receiving unit 110 receives an operation performed by the user, who looks at the displayed first image, on a setting item, and a predetermined condition is satisfied, the display controller 113 causes the display 15 to display the second image over the first image. This condition is, for example, the condition that the command area A2 of the first image is not displayed on the display 15. That is, the display controller 113 illustrated in FIG. 6 is an example of a display controller that causes a display to display a second image over a first image in the case where a command area is not displayed when a receiving unit receives an operation.

Operation of Display Apparatus

Figure 9:
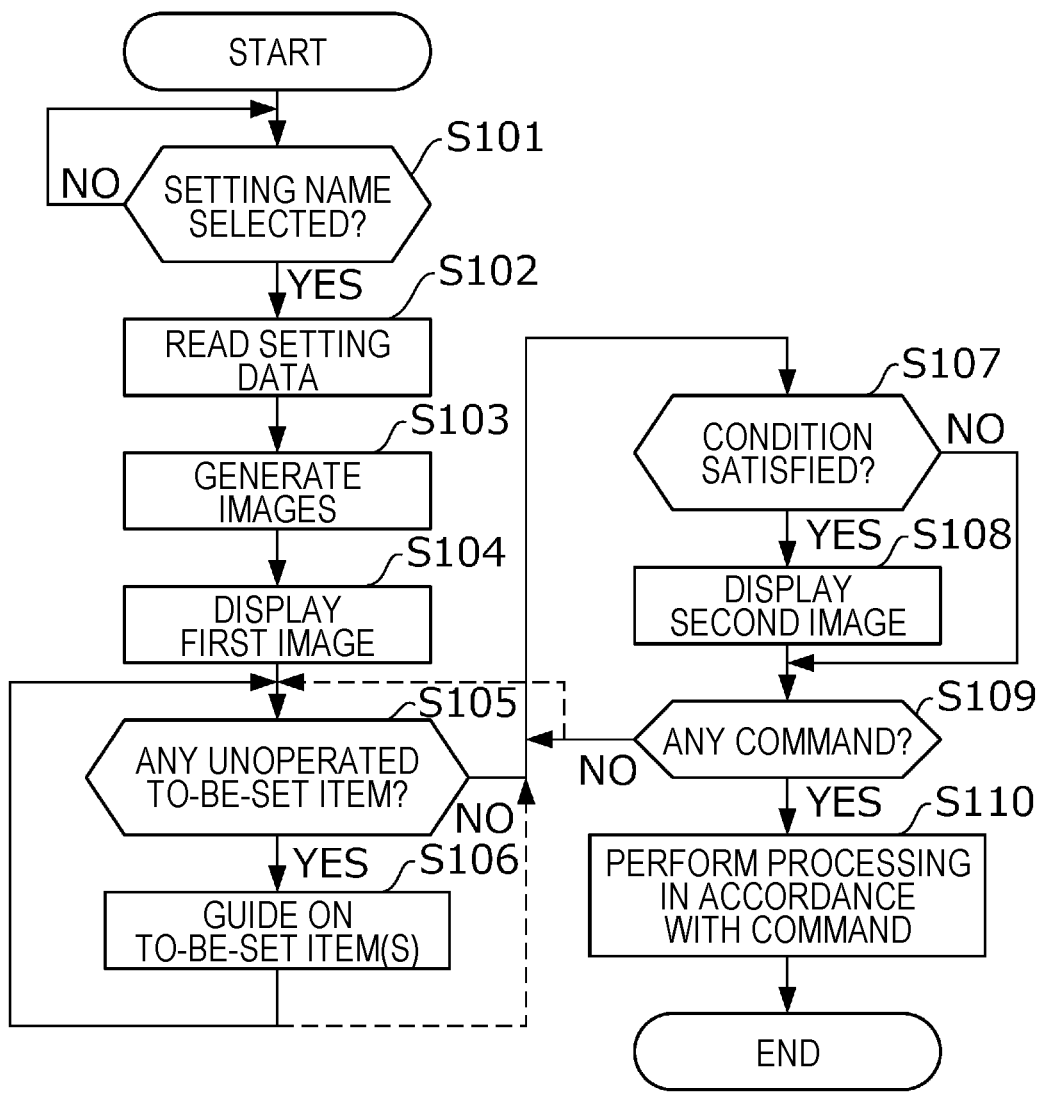
FIG. 9 is a flowchart illustrating the flow of the operation of the display apparatus.

FIG. 9 is a flowchart illustrating the flow of the operation of the display apparatus 1. The controller 11 of the display apparatus 1 causes the display 15 to display, for example, the setting name(s) of a receivable setting(s). The controller 11 receives an operation performed by the user, and determines whether a setting name has been selected by the operation (step S101). In the case where it is determined that no setting name has been selected (NO in step S101), the controller 11 continuously performs the determination in step S101.

In the case where it is determined that a setting name has been selected (YES in step S101), the controller 11 reads setting data from the setting DB 121 (step S102), and generates a first image and a second image (step S103).

The controller 11 causes the display 15 to display the first image generated in step S103 (step S104), and receives an operation performed by the user on the first image.

Figure 10:
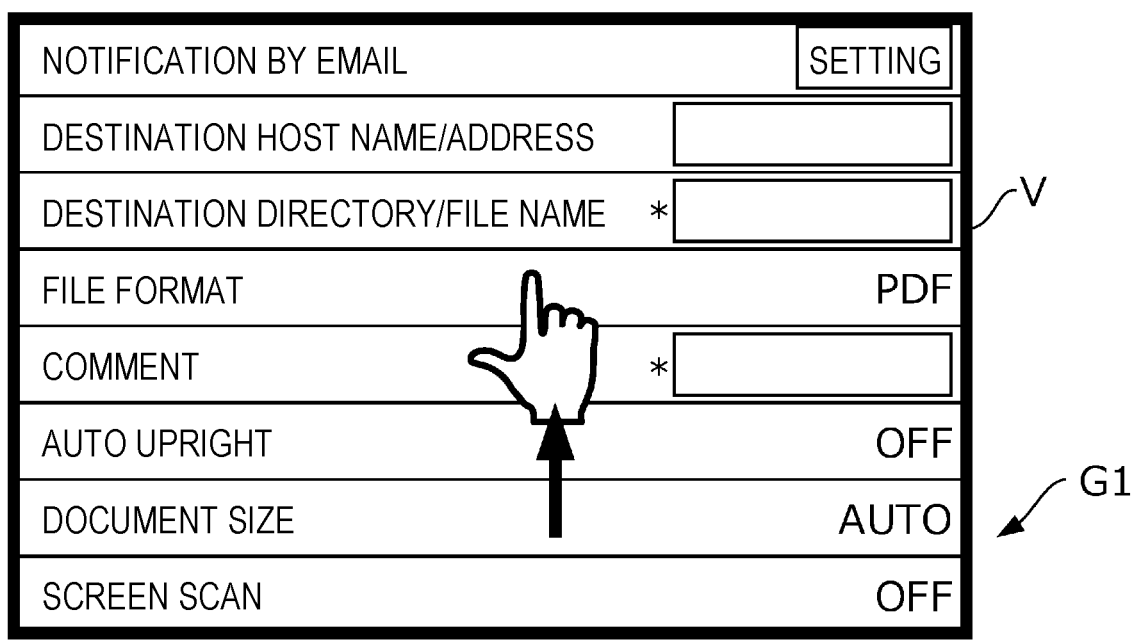
FIG. 10 is a diagram illustrating an example of the first image displayed by a display.

FIG. 10 is a diagram illustrating an example of the first image displayed by the display 15. The size of a display area displayed by the display 15 of the display apparatus 1 is determined in advance, and may be smaller than the first image. For example, a display area V illustrated in FIG. 10 allows displaying of eight setting items of the first image. In short, the display area V illustrated in FIG. 10 is insufficient for displaying the entire first image at one time.

For example, as illustrated in FIG. 10, when the user touches any part of the display area V with a finger or the like and performs an operation to move the finger or the like upward along with the arrow, the operation unit 14 of the display apparatus 1 receives this operation. The controller 11 interprets this operation as an upward flick operation, and moves the display position of the first image downward.

The controller 11 determines whether there is any to-be-set item that has not been set by an operation (referred to as an unoperated to-be-set item) among the setting items represented by the displayed first image (step S105). In the case where it is determined that there is an unoperated to-be-set item(s) (YES in step S105), the controller 11 guides on the to-be-set item(s) (step S106).

FIG. 11 is a diagram illustrating an example of guidance on the to-be-set items. In response to the above-mentioned flick operation, the display area V has moved from the position illustrated in FIG. 10 to a position indicated by a broken line in FIG. 11. The controller 11 determines that, among setting items represented by a first image G1 illustrated in FIG. 11, there are to-be-set items that have not been set because the user has not performed operations, that is, unoperated to-be-set items, and starts guidance on the to-be-set items.

For example, the display controller 113 implemented by the controller 11 displays a separating line L1 at a position relatively defined with respect to the moved display area V. This separator line L1 is drawn at, for example, a position overlapping the fifth setting item from the top, among eight setting items displayable in the display area V. The display controller 113 separately counts the number of unoperated to-be-set items arranged above the separator line L1 and the number of unoperated to-be-set items arranged below the separator line L1, and causes the display 15 to display a message box M1 describing these numbers over the separator line L1.

For example, as illustrated in FIG. 11, the character string "There exist the following to-be-set items: 2 in the upper portion (1 within the screen)/4 in the lower portion (2 within the screen)." is described in the message box M1. By looking at the message box M1, the user recognizes that there are two unoperated to-be-set item above the separator line L1 and four unoperated to-be-set items below the separator line L1. That is, the display 15 under control of the display controller 113 is an example of a display that displays a line separating a display area, and distinguishably displays the number of each set of to-be-set items according to the arrangement with respect to this line.

As described above, the number of unoperated to-be-set items is distinguishably displayed in the message box M1 depending on whether these to-be-set items are within the screen. In the above-described example, the number of unoperated to-be-set items above the separator line L1 is two; among these items, one unoperated to-be-set item is displayed within the screen. In the above-described example, the number of unoperated to-be-set items below the separator line L1 is four; among these items, two unoperated to-be-set items are displayed within the screen.

That is, the message box M1 illustrated in FIG. 11 tells the number of to-be-separated items within the screen, that is, displayed in the display area V, distinguishably from the number of to-be-separated items outside the screen, that is, not displayed in the display area V. In short, the display 15 under control of the display controller 113 is an example of a display that distinguishably displays the number of each set of to-be-set items depending on whether the set of to-be-separated items is displayed.

The controller 11, which has guided on the to-be-set items in step S106 illustrated in FIG. 9, returns the processing back to step S105, and continuously performs the determination.

In contrast, in the case where it is determined that there is no unoperated to-be-set item (NO in step S105), the controller 11 determines whether a predetermined condition is satisfied (step S107). In the case where it is determined that the condition is satisfied (YES in step S107), the controller 11 causes the display 15 to display the second image generated in step S103 over the first image (step S108). In contrast, in the case where it is determined that the above-mentioned condition is not satisfied (NO in step S107), the controller 11 does not advance the processing to S108, but advances the processing to step S109.

For example, in the case where the command area A2 of the first image is not displayed in the display area V of the display 15 as a result of receiving from the user a flick operation for moving the display area V in a direction to display the command area A2 and updating the display in accordance with the flick operation, the controller 11 determines that the above-mentioned condition is satisfied (YES in step S107), and causes the display 15 to display the second image over the first image (step S108).

FIGS. 12A and 12B are diagrams illustrating an example of the second image displayed over the first image. After performing operations on all the unoperated to-be-set items, the user performs an operation to move the display area V downward where the command area A2 of the first image G1 is displayed. On receipt of the operation, in order for the display 15 of the display apparatus 1 to scroll the displayed first image downward, the display area V displays details illustrated in FIG. 12A out of the first image G1. As illustrated in FIG. 12A, the command area A2 of the first image G1 is not displayed in the display area V. Therefore, the display apparatus 1 displays a second image G2 over the first image G1, as illustrated in FIG. 12B.

Although the display controller 113 may display the second image G2 over any part of the first image when displaying the second image G2, the display controller 113 may display the second image G2 over an area of the first image that does not serve as a target of operation.

For example, a separator line L2 illustrated in FIGS. 12A and 12B is a line that represents the boundary between an area B1 and an area B2. The area B1 is an area of the first image G1 that serves as a target of operation. Therefore, a touch operation or a click operation on the area B1 is interpreted as an operation on a corresponding setting item. In contrast, the area B2 is an area of the first image G1 that does not serve as a target of operation. In short, even if the user performs a touch operation or the like on the area B2, this is not interpreted as an operation on the setting item.

As illustrated in FIG. 12B, the display controller 113 causes the display 15 to display the second image G2 over the area B2 of the first image G1. That is, the display 15 under control of the display controller 113 is an example of a display that displays a second image over an area of a first image that does not serve as a target of operation received by a receiving unit. Accordingly, the display apparatus 1 displays the second image G2 without obstructing the user's operation on the first image G1.

The controller 11 determines whether any command is made in the command area A2 of the first image G1 or the command area A3 of the second image G2 (step S109). In the case where it is determined that no command is made (NO in step S109), the controller 11 returns the processing back to step S107.

In contrast, in the case where it is determined that a command is made (YES in step S109), the controller 11 executes processing in accordance with the command (step S110).

As has been described above, the display apparatus 1 according to the present exemplary embodiment receives, in the case where a first image including a setting area and a command area is arranged at a predetermined position and a setting of a setting item is received, a command even if the command area of the first image is not included in a display area.

Modifications

Although the exemplary embodiment has been described as above, the details of the exemplary embodiment may be modified as follows. In addition, the following modifications may be combined.

First Modification

Although the controller 11 of the display apparatus 1 does not determine whether a predetermined condition is satisfied until it is determined in step S105 that there is no unoperated to-be-set item, the controller 11 may determine whether the above-mentioned condition is satisfied regardless of the presence of an unoperated to-be-set item. In the case where it is determined that the condition is satisfied, the controller 11 may cause the display 15 to display the second image over the first image.

For example, the controller 11 may advance the processing to step S107 after step S106 illustrated in FIG. 9, and, in the case where it is determined in step S109 that no command is made, return the processing back to step S105.

Second Modification

In the above-described exemplary embodiment, the controller 11 determines that the above-mentioned condition is satisfied in the case where the command area A2 is not displayed in the display area V of the display 15 as a result of receiving an operation for moving the first image to display the command area A2 and updating the display in accordance with the operation. However, the above-mentioned condition may be other conditions.

For example, the above-mentioned condition may include the condition that there is no unoperated to-be-set item, or the condition that there is no other setting item in an upper layer above a setting item to be set by the most recently received operation.

FIGS. 13A and 13B are diagrams for describing a setting item that belongs to a lower layer. As illustrated in FIG. 4, "N2" is associated with the setting item "notification by email", as the ID of the setting of "child" serving as a lower layer. Therefore, if the user performs a touch operation with a finger or the like on the button of the setting item "notification by email" when the first image G1 illustrated in FIG. 13A is displayed, the controller 11 selects the setting item "notification by email". As illustrated in FIG. 13B, the controller 11 causes the display 15 to display a third image G3 for setting the details of the setting item "notification by email" over the first image G1. The third image G3 is a setting image associated with a setting item for which an operation is received, among setting items included in the first image G1, and is a setting image that belongs to a lower layer viewed from a layer to which the first image G1 belongs.

On receipt of the user's operation on the third image G3, the controller 11 determines that there is another setting item in an upper layer above a setting item to be set by the received operation. Therefore, in this case, the controller 11 does not cause the display 15 to display the second image G2.

Third Modification

The above-mentioned condition may include the condition that a predetermined time period has elapsed since the most recent operation. For example, in the case where a predetermined time period has elapsed since the most recent operation and the command area A2 is not displayed in the display area V of the display 15, the controller 11 causes the display 15 to display the second image G2 over the first image G1. This time period may be determined for each setting, or may be determined for each setting item included in a setting.

That is, the display 15 is an example of a display that, in the case where the command area is not displayed when the receiving unit receives an operation on any of the setting items, displays the second image after a predetermined time period has elapsed since the operation, the predetermined time period being determined in accordance with the setting item.

Fourth Modification

Besides the time point at which the second image G2 is displayed, the time point at which the displayed image G2 is deleted may be defined. The time point for displaying and deleting the second image may be defined for each user.

FIG. 14 is a diagram illustrating the time point at which the second image is displayed, which is defined for every combination of a user and a setting item. The memory 12 of the display apparatus 1 stores parameters illustrated in FIG. 14. The controller 11 of the display apparatus 1 reads the parameters illustrated in FIG. 14 from the memory 12, and displays the second image using these parameters.

For example, when a user U1 performs an operation on a setting item indicated by the ID "M1" of a setting indicated by the ID "N1", the second image is displayed one second after the operation. Then, the second image becomes not displayed four seconds after the above-mentioned operation.

In contrast, when a user U2 performs an operation on the setting item indicated by the ID "M1" of the setting indicated by the ID "N1", the second image is displayed 0 seconds after the operation, that is, immediately after the operation. Then, the second image becomes not displayed five seconds after the above-mentioned operation.

Because the second image is displayed at a time point different for each user in this configuration, different settings may be made in accordance with each user's preferences or speed of determination. Because the second image is displayed at a time point different for each setting item, different settings may be made in accordance with the complexity of details of each setting item.

Fifth Modification

In the above-described modification, the controller 11 does not cause the display 15 to display the second image G2 in the case where the controller 11 determines that there is another setting item in an upper layer above a setting item to be set by the received operation. However, control applied by the controller 11 is not restricted to this case.

For example, in the case where the controller 11 determines that there is another setting item in an upper layer above a setting item to be set by the received operation, the controller 11 may apply control to display the second image after a time period longer than that in the case where there is no setting item in the upper layer has elapsed.

Figure 15A:
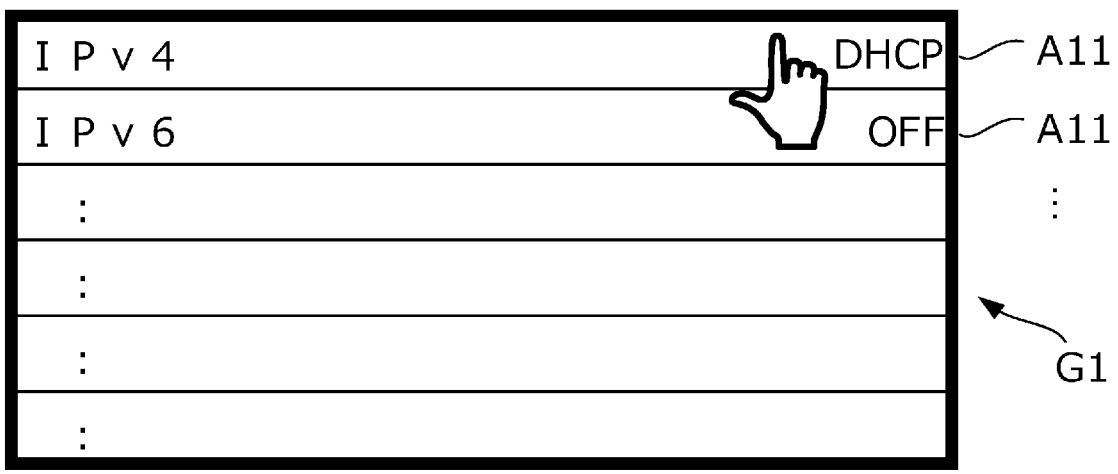
FIGS. 15A and 15B are diagrams illustrating an example in which setting items in a lower layer are expanded.
Figure 15B:
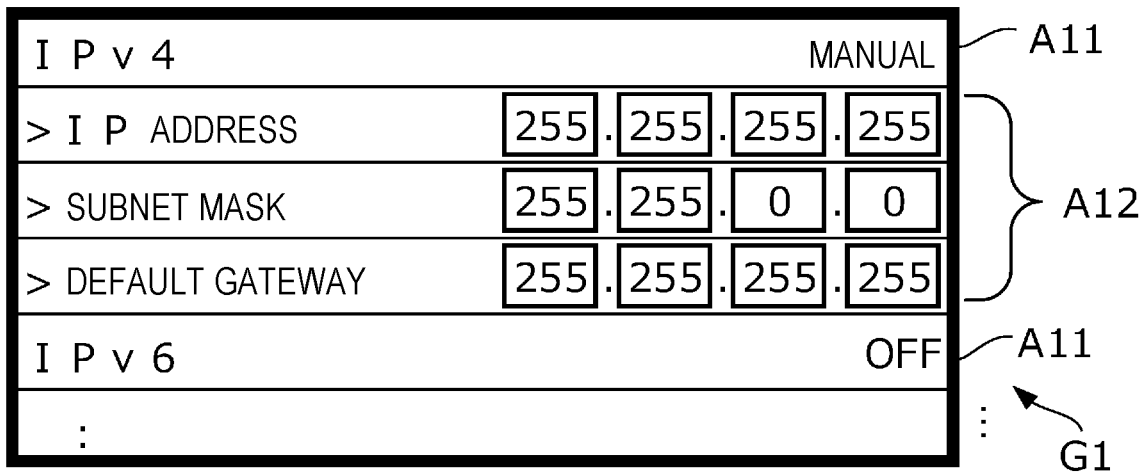

FIGS. 15A and 15B are diagrams illustrating an example in which setting items in a lower layer are expanded. "IPv4" illustrated in FIG. 15A is the setting name of a setting item regarding "Internet Protocol version 4". A value set to "IPv4" illustrated in FIG. 15A is "DHCP". For IPv4, it is agreed to dynamically allocate a network address by using a Dynamic Host Configuration Protocol (DHCP) server.

The settings of "IPv4" include two settings, "DHCP", which is mentioned above, and "manual". In the state illustrated in FIG. 15A, when the user performs an operation on the setting item area A11 representing the setting item "IPv4", the value is switched to "manual", as illustrated in FIG. 15B. Then, a setting item area A12 displaying setting items in a lower layer associated with the setting item "IPv4" is expanded.

The setting items in the lower layer that are expanded when the value of "IPv4" is switched to "manual" are "IP address", "subnet mask", and "default gateway", as illustrated in FIG. 15B, and all of them are set by a combination of four numerals. When the value of "IPv4" is set to "manual", unlike when the value is set to "DHCP", it requires a manual input of a combination of four numerals for each of these three setting items.

FIG. 16 is a diagram for describing the second image displayed in the case where setting items in the lower layer are expanded. When the display 15 displays the first image illustrated in FIG. 15B, the display apparatus 1 displays the second image G2 over the first image G1 after a time period longer than that in the case where the value of "IPv4" is "DHCP" has elapsed. The reason is that, when other setting items in a lower layer below the setting item "IPv4" are expanded, it takes a longer time period for the user to set the expanded setting items than when the setting items are not expanded, and an operation for confirming these settings is not required until the time period elapses.

That is, the display 15 in this case is an example of a display that, in the case where there is another setting item in an upper layer above a setting item to be set by an operation received by the receiving unit, displays a second image after a time period longer than that in the case where there is no setting item in the upper layer has elapsed.

Sixth Modification

Although the time point at which the second image is displayed is determined for each setting item in the above-described modification, this time point may change depending on whether the setting of an operated setting item contradicts the setting of another setting item.

FIG. 17 is a diagram illustrating an example of a setting item set with a radio button. The "file format" illustrated in FIG. 17 is the setting name of a setting item for setting the format of a file for saving an image. In FIG. 17, the value of "file format" is "PDF".

FIG. 18 is a diagram illustrating an example in which a radio button is expanded for setting. When the user performs an operation on the setting item area A11 representing the setting item "file format" in the state illustrated in FIG. 17, a setting item area A13 representing four radio buttons is expanded, as illustrated in FIG. 18. These four radio buttons are "PDF", "XPS", "TIFF", and "JPEG", and are the names of file formats for images.

By the way, there are some setting items whose settings are restricted by a value set to another setting item. For example, since "JPEG" has no mode for saving in monochrome with two gradations, if "color mode" is "auto detect", the user is not allowed to set "file format" to "JPEG".

FIG. 19 is a diagram illustrating the displayed details when a setting based on a received operation contradicts the setting of another setting item. When the user sets "color mode" to "auto detect" and then sets "file format" to "JPEG", the controller 11 of the display apparatus 1 detects a contradiction between these setting items. As illustrated in FIG. 19, the controller 11 causes the display 15 to display a message box M2 over the first image G1. The message box M2 describes a warning expressing the detected contradiction.

When displaying the message box M2 illustrated in FIG. 19, the controller 11 of the display apparatus 1 displays the second image G2 after a time period longer than that in the case where the message box M2 is not displayed has elapsed. Accordingly, the user is given time to read and understand the details of the warning included in the message box M2. Because the display apparatus 1 does not display the second image G2 until the above-mentioned time period has elapsed, an operation performed by the user who tries to confirm the setting without reading the details of the warning is not received.

That is, the display 15 in this case is an example of a display that, in the case where the setting of a setting item based on an operation received by the receiving unit contradicts the setting of another setting item, displays a second image after a time period longer than that in the case where there is no contradiction has elapsed.

Seventh Modification

Although the controller 11 of the display apparatus 1 functions as the receiving unit 110, the first generating unit 111, the second generating unit 112, and the display controller 113 by reading and executing a program stored in the memory 12, these functions may be implemented by the controller 21 of the image processing apparatus 2. In this case, the image processing apparatus 2 may also serve as the display apparatus 1 in the above-described exemplary embodiment.

Eighth Modification

A program executed by the controller 11 of the above-described display apparatus 1 is an example of a program causing a computer including a display to function as: a first generating unit that generates a first image including a setting area for receiving a setting of a setting item and a command area for receiving a command regarding the setting; a second generating unit that generates a second image representing the command area; a receiving unit that receives an operation performed by a user; and a display controller that causes the display to display the second image over the first image in a case where the command area is not displayed when the receiving unit receives the operation. The program may be provided by being stored in a computer-device-readable recording medium such as a magnetic recording medium including a magnetic tape and a magnetic disk, an optical recording medium including an optical disk, a magneto-optical recording medium, and semiconductor memory. The program may be downloaded via a communication line such as the Internet. Note that various apparatuses and processors other than a CPU may be applied to a controller exemplified by the above-described controller 11.

Here, the term "processor" refers to a processor in a broad sense. The processor includes general processors (e.g., CPU: Central Processing Unit) and dedicated processors (e.g., GPU: Graphics Processing Unit, ASIC: Application Integrated Circuit, FPGA: Field Programmable Gate Array, and programmable logic device).

The operation of the processor in the above-described exemplary embodiment may be implemented not only by one processor, but by plural processors in collaboration which are located physically apart from each other but may work cooperatively. The order of operations of the processor is not limited to one described in the exemplary embodiment above, and may be changed.

The above-described display apparatus 1 may be an information processing apparatus such as a computer that establishes connection with an external display via the communication unit 13. The information processing apparatus need not include the above-described internal display 15 as long as the processor included in the controller 11 applies control to an external display to display a specified image. That is, the above-mentioned information processing apparatus may be expressed as below.

An information processing apparatus includes one or more processors configured to: generate a first image including a setting area for receiving a setting of a setting item, and a command area for receiving a command regarding the setting; generate a second image representing the command area; receive an operation on the setting item performed by a user; and in a case where the command area is not displayed upon receipt of the operation, cause a display to display the second image over the first image.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A display apparatus comprising:
    a processor configured to:
        generate a first image including: (i) a setting area for receiving a setting of a setting item; and (ii) a command area for receiving a command regarding the setting;
        generate a second image representing the command area;
        receive an operation on the setting item performed by a user;
        display the second image over the first image in a case where the command area is not displayed when the processor receives the operation; and
        in a case where the command area is not displayed when the processor receives an operation on any of a plurality of setting items, display the second image after a predetermined time period has elapsed since the operation, the predetermined time period being determined in accordance with the setting item.

2. The display apparatus according to claim 1, wherein, in a case where the setting of the setting item based on the operation received by the processor contradicts a setting of another setting item, the processor is configured to display the second image after a time period longer than that in a case where there is no contradiction has elapsed.

3. The display apparatus according to claim 2, wherein:
    the setting items have an hierarchical structure, and
    in a case where there is another setting item in an upper layer above the setting item to be set by the operation received by the processor, the processor is configured to display the second image after a time period longer than that in a case where there is no other setting item in the upper layer has elapsed.

4. The display apparatus according to claim 3, wherein the processor is configured to display a number of to-be-set items, the to-be-set items being, among the setting items, setting items that require setting by the operation.

5. The display apparatus according to claim 4, wherein the processor is configured to distinguishably display a number of each set of to-be-set items depending on whether the set of to-be-set items is displayed.

6. The display apparatus according to claim 2, wherein the processor is configured to display a number of to-be-set items, the to-be-set items being, among the setting items, setting items that require setting by the operation.

7. The display apparatus according to claim 6, wherein the processor is configured to distinguishably display a number of each set of to-be-set items depending on whether the set of to-be-set items is displayed.

8. The display apparatus according to claim 1, wherein:
    the setting items have an hierarchical structure, and
    in a case where there is another setting item in an upper layer above the setting item to be set by the operation received by the processor, the processor is configured to display the second image after a time period longer than that in a case where there is no other setting item in the upper layer has elapsed.

9. The display apparatus according to claim 8, wherein the processor is configured to display a number of to-be-set items, the to-be-set items being, among the setting items, setting items that require setting by the operation.

10. The display apparatus according to claim 9, wherein the processor is configured to distinguishably display a number of each set of to-be-set items depending on whether the set of to-be-set items is displayed.

11. The display apparatus according to claim 1, wherein the processor is configured to display a number of to-be-set items, the to-be-set items being, among the setting items, setting items that require setting by the operation.

12. The display apparatus according to claim 11, wherein the processor is configured to distinguishably display a number of each set of to-be-set items depending on whether the set of to-be-set items is displayed.

13. The display apparatus according to claim 12, wherein the processor is configured to distinguishably display a line separating a display area, and is configured to distinguishably display a number of each set of to-be-set items according to arrangement with respect to the line.

14. The display apparatus according to claim 11, wherein the processor is configured to distinguishably display a line separating a display area, and distinguishably display a number of each set of to-be-set items according to arrangement with respect to the line.

15. The display apparatus according to claim 1, wherein the processor is configured to display the second image over an area of the first image that does not serve as a target of operation received by the processor.

16. An image processing apparatus comprising:

the display apparatus according to claim 1; and a processor that processes an image using a setting item set by the display apparatus.

17. A non-transitory computer readable medium storing a program causing a computer including a display to function as:

a first generating unit that generates a first image including: (i) a setting area for receiving a setting of a setting item; and (ii) a command area for receiving a command regarding the setting;

a second generating unit that generates a second image representing the command area;

a receiving unit that receives an operation performed by a user; and a display controller that causes the display to display the second image over the first image in a case where the command area is not displayed when the receiving unit receives the operation, wherein in a case where the command area is not displayed when the receiving unit receives an operation on any of a plurality of setting items, the display controller causes the display to display the second image after a predetermined time period has elapsed since the operation, the predetermined time period being determined in accordance with the setting item.

* * * * *